United States Patent
Nagaya

(10) Patent No.: US 9,758,215 B2
(45) Date of Patent: Sep. 12, 2017

(54) FUEL CELL TWO-WHEELED VEHICLE

(71) Applicant: SUZUKI MOTOR CORPORATION, Hamamatsu-shi, Shizuoka (JP)

(72) Inventor: Keita Nagaya, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 17 days.

(21) Appl. No.: 14/874,743

(22) Filed: Oct. 5, 2015

(65) Prior Publication Data

US 2016/0121964 A1  May 5, 2016

(30) Foreign Application Priority Data

Oct. 30, 2014 (JP) .................. 2014-221735

(51) Int. Cl.
*B62M 7/12* (2006.01)
*H01M 8/04014* (2016.01)
(Continued)

(52) U.S. Cl.
CPC ............... *B62M 7/12* (2013.01); *B60L 1/003* (2013.01); *B60L 11/184* (2013.01); *B60L 11/1805* (2013.01); *B60L 11/1868* (2013.01); *B60L 11/1877* (2013.01); *B60L 11/1887* (2013.01); *B60L 11/1892* (2013.01); *B60L 11/1896* (2013.01); *B62J 35/00* (2013.01); *H01M 8/04014* (2013.01); *H01M 8/04201* (2013.01); *H01M 10/613* (2015.04); *H01M 10/625* (2015.04); *H01M 10/6551* (2015.04); *H01M 10/6563* (2015.04); *H01M 16/006* (2013.01); *B60L 2200/12* (2013.01); *B60L 2240/545* (2013.01); *B60L 2240/547* (2013.01); *B60L 2240/549* (2013.01); *H01M 10/66* (2015.04); *H01M 2220/20* (2013.01); *H01M 2250/20* (2013.01); *Y02T 10/7066* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01);
(Continued)

(58) Field of Classification Search
CPC ......... B62M 7/12; B60L 1/003; B60L 11/184; B60L 11/1805; H01M 10/613; H01M 10/625; H01M 10/6551; H01M 10/6563
USPC ........................................... 180/220
See application file for complete search history.

(56) References Cited

U.S. PATENT DOCUMENTS 8,479,857 B2   7/2013  Tamura
2008/0217087 A1*  9/2008  Ito .................... B60K 1/04
                                                  180/220
(Continued)

FOREIGN PATENT DOCUMENTS

JP   2002187587 A   7/2002
JP   2009078623 A   4/2009
JP   2010274714 A   12/2010

*Primary Examiner* — Jacob Knutson
*Assistant Examiner* — Felicia L Brittman
(74) *Attorney, Agent, or Firm* — Troutman Sanders LLP

(57) ABSTRACT

A fuel cell two-wheeled vehicle includes an electric machine configured to drive a drive wheel, an air-cooled fuel cell configured to supply electric power to the electric machine, and a fuel gas tank that accumulates fuel gas supplied to the fuel cell. A battery pack is disposed in a space between an intake air inlet and an air intake duct and surrounded by a seat and a vehicle body cover. The intake air inlet is disposed below a front portion of the seat.

4 Claims, 10 Drawing Sheets

(51) Int. Cl.
*H01M 16/00* (2006.01)
*H01M 10/625* (2014.01)
*H01M 10/6563* (2014.01)
*B62J 35/00* (2006.01)
*B60L 11/18* (2006.01)
*H01M 8/04082* (2016.01)
*H01M 10/6551* (2014.01)
*H01M 10/613* (2014.01)
*B60L 1/00* (2006.01)
*H01M 10/66* (2014.01)

(52) U.S. Cl.
CPC ................ *Y02T 90/32* (2013.01); *Y02T 90/34* (2013.01); *Y04S 30/14* (2013.01)

(56) References Cited

U.S. PATENT DOCUMENTS

| | | |
|---|---|---|
| 2010/0300785 A1 | 12/2010 | Tamura |
| 2012/0103716 A1* | 5/2012 | Fujihara ............... B60L 11/1877 180/220 |
| 2016/0056482 A1* | 2/2016 | Otsuka ................ B60L 11/1898 180/220 |

* cited by examiner

FUEL CELL TWO-WHEELED VEHICLE

CROSS-REFERENCE TO RELATED APPLICATIONS

This application is based upon and claims the benefit of priority of the prior Japanese Patent Application No. 2014-221735, filed on Oct. 30, 2014, the entire contents of which are incorporated herein by reference.

BACKGROUND OF THE INVENTION

Field of the Invention

The present invention especially relates to a scooter type fuel cell motorcycle that runs with electric power generated by fuel cell.

Description of the Related Art

A fuel cell vehicle that includes a fuel tank, a fuel cell stack (hereinafter simply referred to as a fuel cell), a secondary battery, and an electric motor has been developed. The fuel tank stores a fuel, for example, hydrogen gas. The fuel cell generates electric power by chemical reaction of fuel and air, specifically oxygen in the air. The electric motor drives drive wheels.

A fuel cell system of this type generates a considerable amount of heat corresponding to the electric power generated in association with the power generation. A fuel cell system for four-wheeled vehicle includes a water-cooled cooling system featuring high cooling efficiency and a compressor. The compressor sends a large amount of air to the fuel cell system to generate a large amount of electric power. Some fuel cell two-wheeled vehicles also include the water-cooled fuel cell system that can generate comparatively large amount of electric power. Meanwhile, with an air-cooled fuel cell system whose generated electric power is designed to be a comparatively low electric power, around several kW, a large amount of accessories and a similar member related to the cooling system of the water-cooled fuel cell system are unnecessary. There is an example where the water-cooled fuel cell system is used for a vehicle such as the fuel cell two-wheeled vehicle, which can run at a low output.

For example, as disclosed in Patent Document 1, the following arrangement structure is employed. The fins are provided to cool the electronic components. Travelling wind, which is caused to pass through so as to go along the frame cover, is given to cool the DC/DC converter.

As disclosed in Patent Document No. 2, the following structure is employed. The electronic components requiring various cooling are disposed under the seat on which a rider is seated to ensure protecting the fuel cell. Further, taking the travelling wind into the frame cover ensures cooling the electronic components and taking in cooling wind for the air-cooled fuel cell.

As disclosed in Patent Document No. 3, the following vehicle structure is employed. To avoid influence from rain and mud spatters to intake air for the air-cooled fuel cell, the fuel cell is disposed above the frame.

Patent Document 1: Japanese Laid-open Patent Publication No. 2002-187587
Patent Document No. 2: Japanese Laid-open Patent Publication No. 2010-274714
Patent Document No. 3 Japanese Laid-open Patent Publication No. 2009-78623

To internally generate electricity from fuels, hydrogen and oxygen, the air-cooled fuel cell mounted on the fuel cell two-wheeled vehicle performs forced inspiration with the fans. The air intake efficiency affects power output. Generally, to prevent inducing performance degradation or a similar degradation due to high temperature of the electron system components, such as a battery, water cooling and a forced air cooling structure with the fans are employed.

However, with the above-described conventional technique, if another component is disposed in front of an air intake duct of the air-cooled fuel cell, the component causes a loss of intake air pressure. This degrades power generation efficiency, resulting in degrade of power output. Adding the water cooling and the forced air cooling structure for cooling the electronic components newly require a radiator and a cooling fan. Including these components, this results in increase in vehicle weight or a similar problem due to restriction in the layout of the components and increase in the count of components.

SUMMARY OF THE INVENTION

To solve the actual conditions, an object of the present invention is to provide a fuel cell two-wheeled vehicle that efficiently and effectively enhances an air intake efficiency to improve power generation efficiency with a considerably simple configuration.

The fuel cell two-wheeled vehicle according to the present invention includes an electric machine configured to drive a drive wheel, an air-cooled fuel cell configured to supply electric power to the electric machine, and a fuel gas tank that accumulates fuel gas supplied to the fuel cell. The fuel cell is inclined forward inside a vehicle body cover. The vehicle body cover covers a right and left and backward and forward of a seat from a lower side. The fuel cell is disposed above the drive wheel and downward the seat. An air intake duct is disposed at a front of the fuel cell. An air intake fan is coupled to an exhaust air duct. The air intake fan is configured to introduce air for both reaction and cooling to the fuel cell. The exhaust air duct is disposed at a rear of the air intake fan. Air that has passed through the exhaust air duct is discharged from a discharge port of the exhaust air duct to a lower surface side of the vehicle body cover. A battery pack is disposed in a space between an intake air inlet and the air intake duct and surrounded by the seat and the vehicle body cover. The intake air inlet is disposed below a front portion of the seat.

The fuel cell two-wheeled vehicle according to the present invention is configured as follows. A cooling fin is disposed on a top surface of the battery pack along a vehicle front-rear direction.

The fuel cell two-wheeled vehicle according to the present invention is configured as follows. The cooling fin is disposed approximately parallel to the top surface of the battery pack in a vehicle side view. A rear portion of the top surface is inclined downward to a rear at an approximately identical angle to a bottom surface of the air intake duct. A top of the cooling fin at the rear portion is coupled to the bottom surface of the air intake duct on an approximately identical one surface.

The fuel cell two-wheeled vehicle according to the present invention is configured as follows. In a vehicle front view, the battery pack is disposed approximately symmetric with respect a vehicle center line.

DETAILED DESCRIPTION OF THE PREFERRED EMBODIMENTS

The following describes preferable embodiments of a fuel cell two-wheeled vehicle according to the present invention with reference to the drawings.

Figure 1:
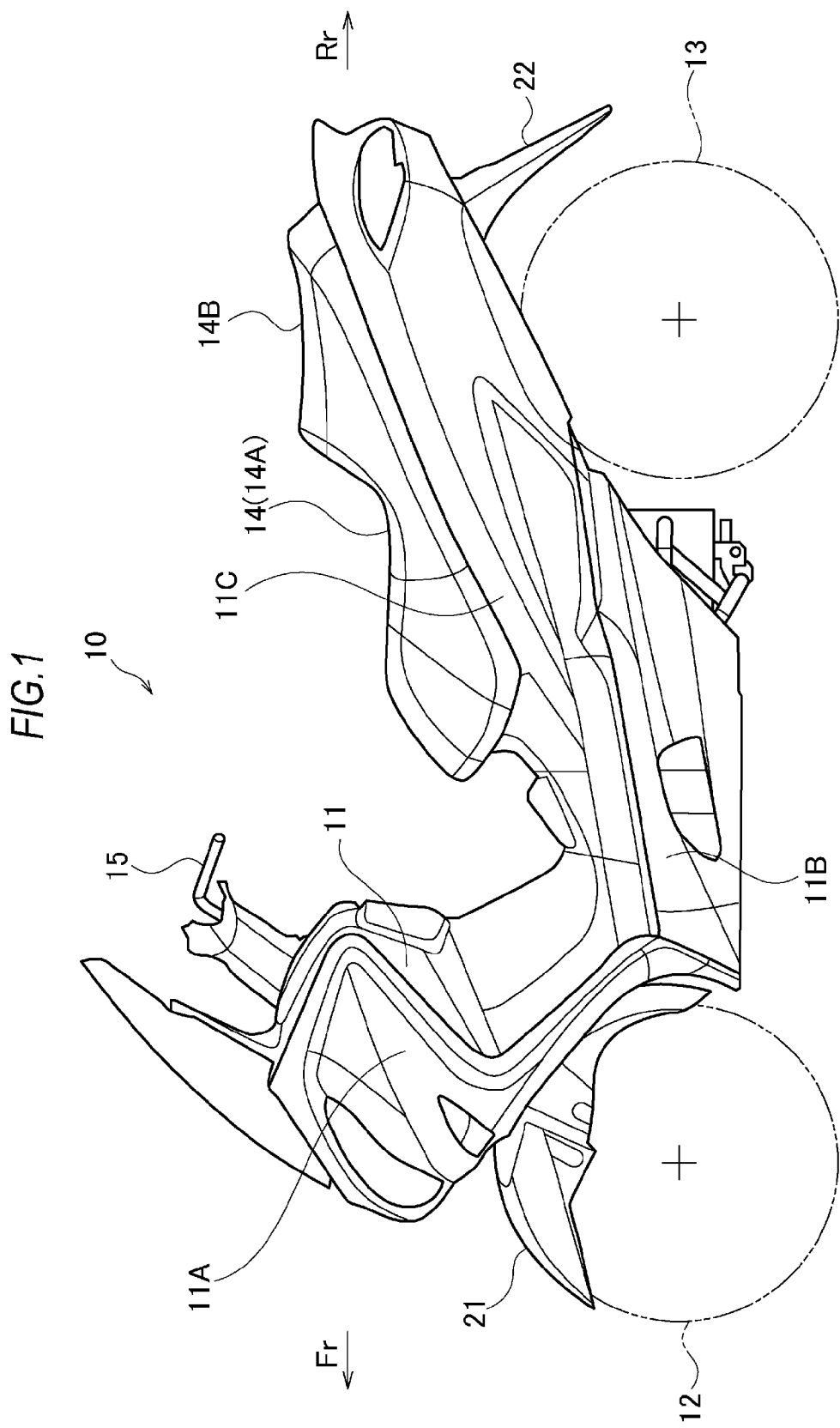
FIG. 1 is a left side view of a fuel cell two-wheeled vehicle covered with a vehicle body cover of an embodiment of the present invention.
Figure 2:
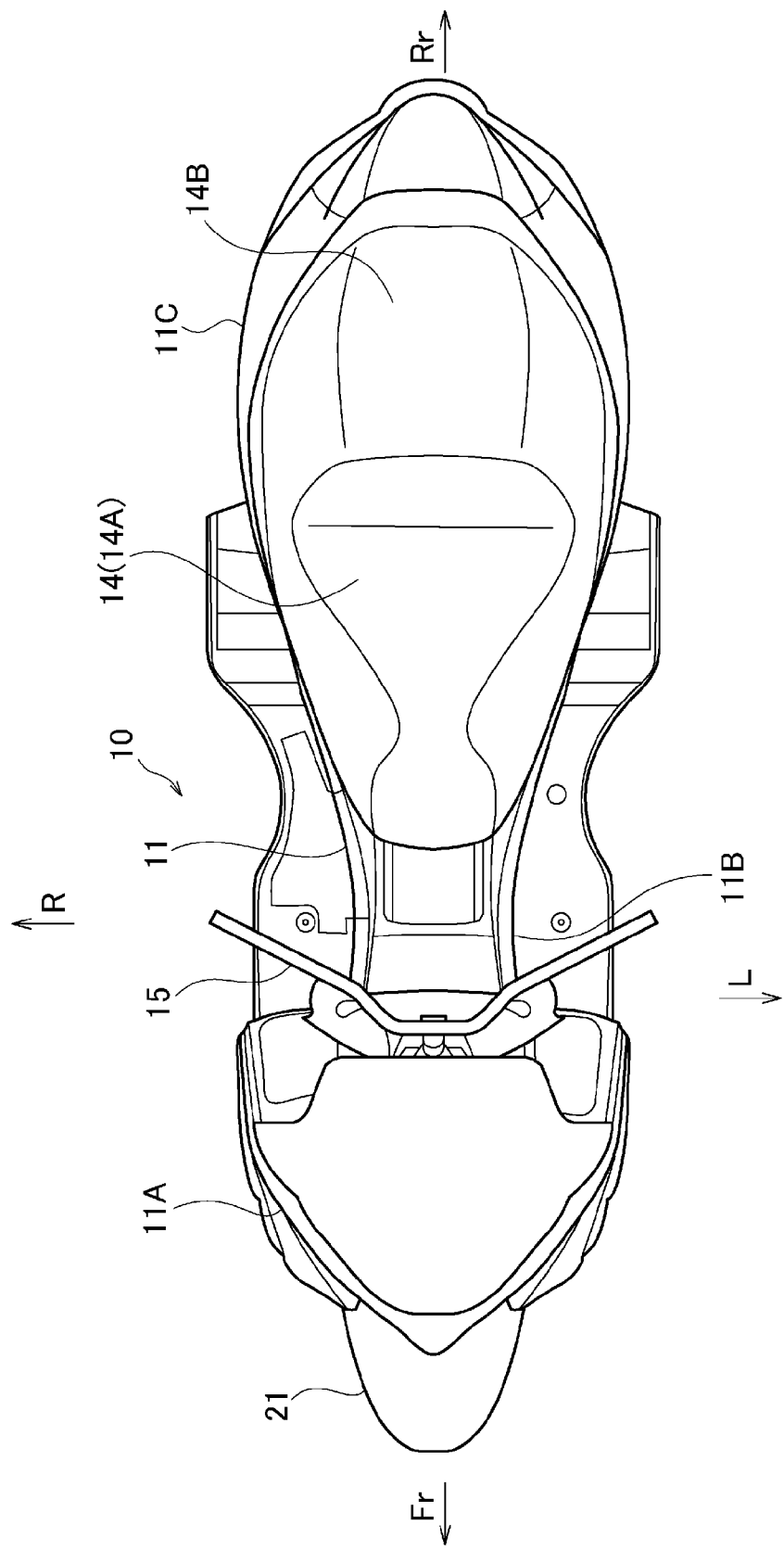
FIG. 2 is a top view of the fuel cell two-wheeled vehicle in FIG. 1 according to the embodiment of the present invention.
Figure 3:
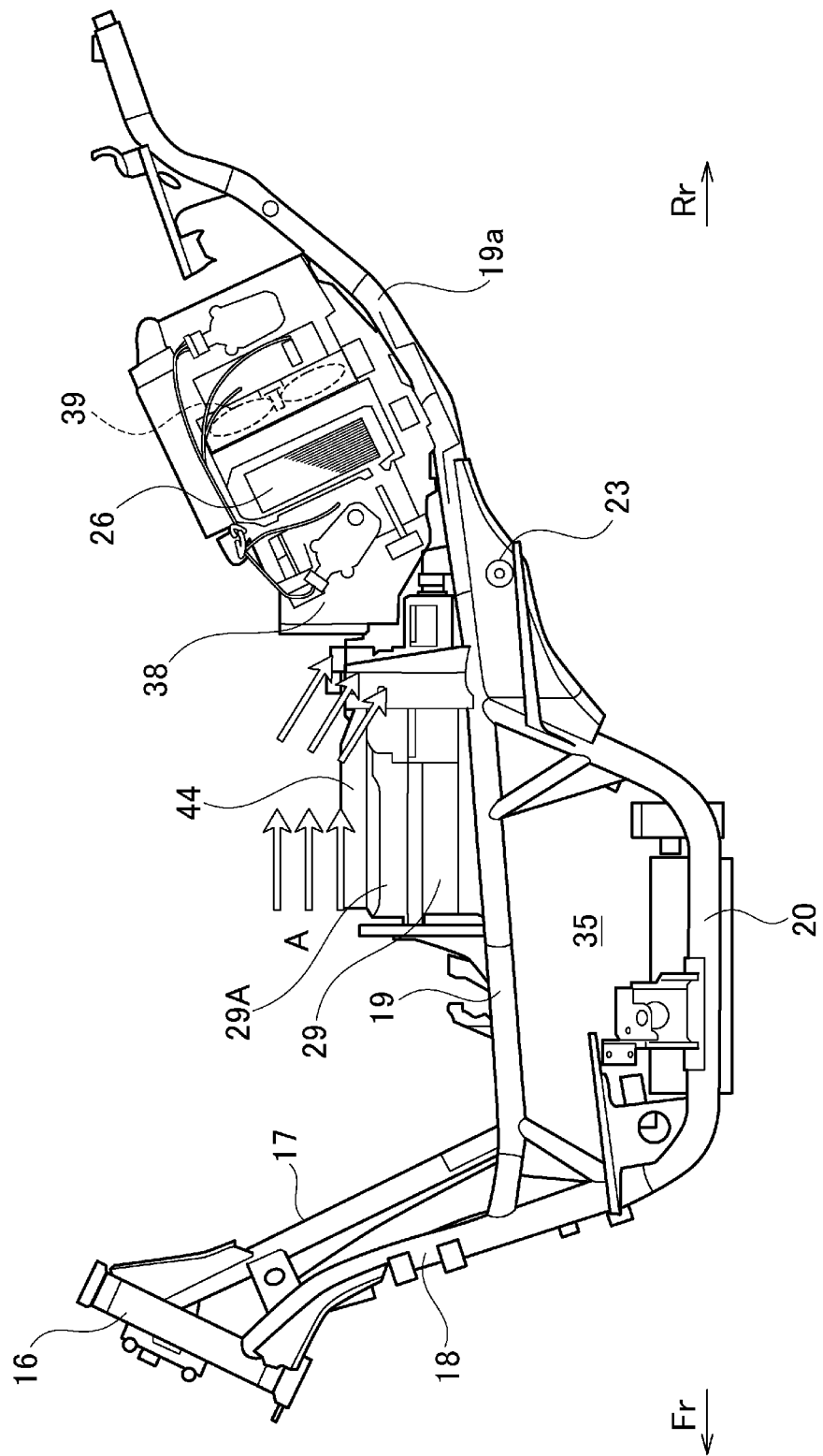
FIG. 3 is a left side view illustrating a main structure inside a vehicle body whose vehicle body cover of the embodiment of the present invention is removed.
Figure 4:
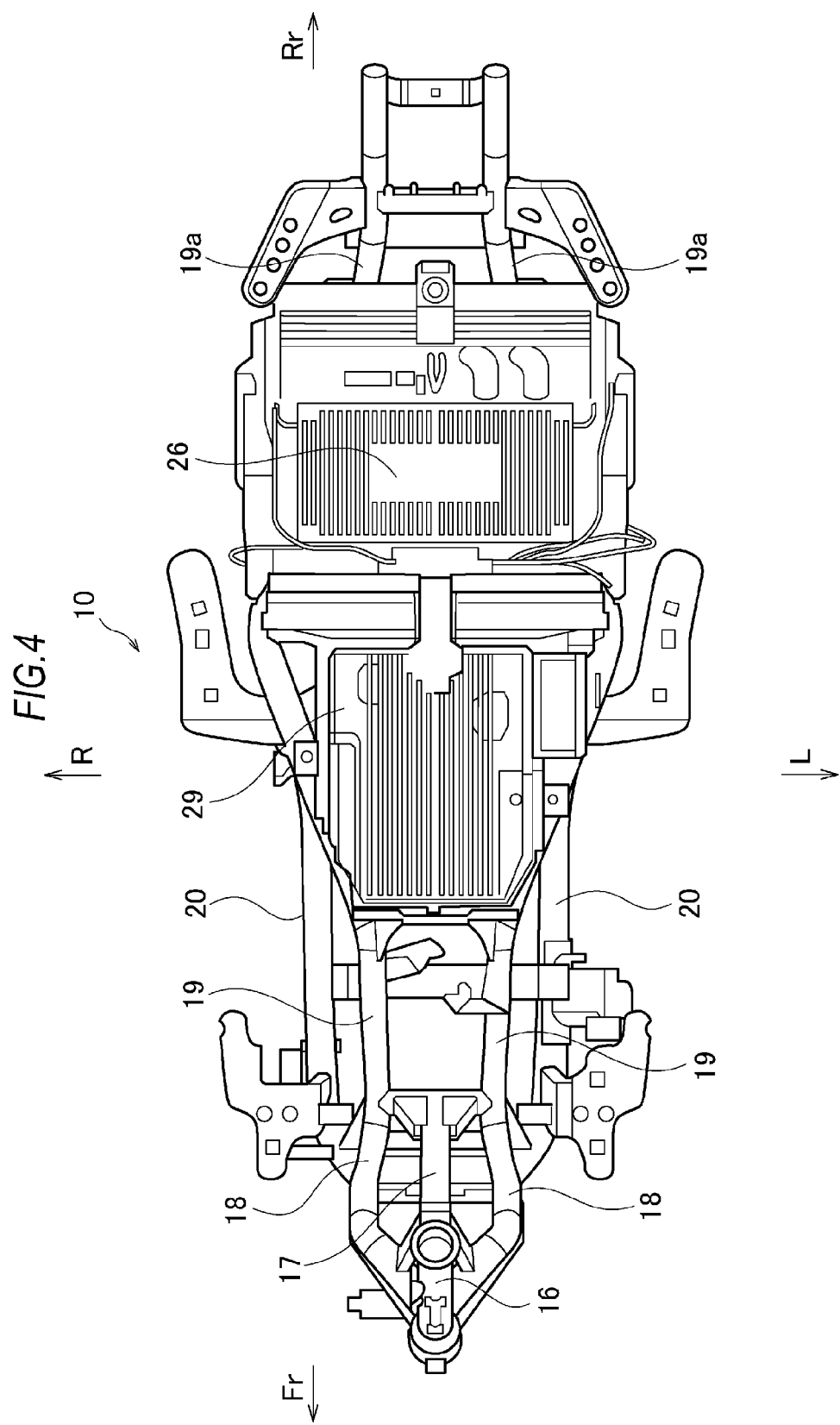
FIG. 4 is a top view of the fuel cell two-wheeled vehicle in FIG. 3 according to the embodiment of the present invention.

FIG. 1 is a left side view of a fuel cell two-wheeled vehicle 10 covered with a vehicle cover. FIG. 2 is a top view of the fuel cell two-wheeled vehicle 10. FIG. 3 is a left side view illustrating a main structure inside a vehicle body whose vehicle body cover is removed. FIG. 4 is a top view of the fuel cell two-wheeled vehicle 10. Including FIG. 1, the drawings used in the following description indicate the front side of the vehicle by an arrow Fr and the rear side of the vehicle by an arrow Rr as necessary. Additionally, the arrow R indicates the right lateral side of the vehicle while the arrow L indicates the left lateral side of the vehicle.

The fuel cell two-wheeled vehicle 10 as the fuel cell vehicle according to the embodiment of the present invention includes a fuel cell, which will be described later. The fuel cell two-wheeled vehicle 10 is a motorcycle running using electric power obtained from this fuel cell. An air-cooled fuel cell system using hydrogen gas as its fuel is employed for the fuel cell. The fuel cell two-wheeled vehicle 10 in this example is a scooter type motorcycle as illustrated in FIG. 1 and FIG. 2. The entire vehicle body is covered with a vehicle body cover 11, which is an exterior member. Accordingly, the internal structure is basically not exposed to the outside. The vehicle body cover 11 includes a front body cover 11A, a center body cover 11B, and a rear body cover 11C. The front body cover 11A covers the front of the vehicle body from the front. The center body cover 11B covers the center of the vehicle body at the lower portion of the vehicle body where footrests are provided from the top and bottom and the right and left. The rear body cover 11C covers the right and left and backward and forward of a seat, which will be described later, from downward. At the front and rear of the vehicle, a front wheel 12, which is a steered wheel, and a rear wheel 13, which is a drive wheel, are disposed. A rider who is seated on a seat 14 can steer the front wheel 12 with handlebars 15.

At the inside of the vehicle body cover 11, a vehicle body frame, which forms a skeleton structure of the vehicle body, is provided. As illustrated in FIG. 3 and FIG. 4, this vehicle body frame includes an upper down frame 17, a lower down frame 18, a right and left pair of upper frames 19, and a right and left pair of under frames 20. The upper down frame 17 extends from a head pipe 16 obliquely downward to the rear. The lower down frame 18 branches into two portions from the head pipe 16 and extends obliquely downward to the rear at the lower side of the upper down frame 17. The under frames 20 are disposed approximately under the upper frames 19. These frame members mutually join together at predetermined sites to form the three-dimensional skeleton structure of the vehicle body.

A right and left pair of front forks (not illustrated) are provided so as to be turnably supported by the head pipe 16 laterally. The handlebars 15 are secured to the upper ends of these front forks. Handlebar grips, which are gripped by the rider, are provided on both ends of the handlebars 15. To the lower portions of the front forks, the front wheel 12 is rotatably supported. Additionally, a front fender 21 is secured so as to cover the top of the front wheel 12. Also with reference to FIG. 5, the upper frames 19 extend up to the rear portion of the vehicle. The upper frames 19 curve obliquely upward to the rear in its course and then support a rear fender 22 near the rear end portion. A pivot shaft 23 (FIG. 3 and FIG. 5) is laterally bridged at the approximately center portion in the vehicle front-rear direction on the upper frames 19. Via this pivot shaft 23, a swing arm 24 is swingably supported in the vertical direction. A rear shock absorber 25 is installed between the upper frame 19 and the swing arm 24 in a predetermined manner. The rear shock absorber 25 can absorb an impact transmitted from the rear wheel 13, which is supported to the rear end of the swing arm 24.

The fuel cell two-wheeled vehicle 10 mounts an electric motor (FIG. 5 abbreviates an electric motor 27 by one dot chain line), which will be described later, as a power engine, which is a power source for the fuel cell two-wheeled vehicle 10. This electric motor 27 is integrally installed to the swing arm 24. Thus, a unit swing type swing arm is configured. The output shaft of the electric motor 27 is coupled to a wheel axis of the rear wheel 13 via a transmission (not illustrated). The driving power, which is generated by the electric motor 27, is transmitted to the rear wheel 13.

Figure 6:
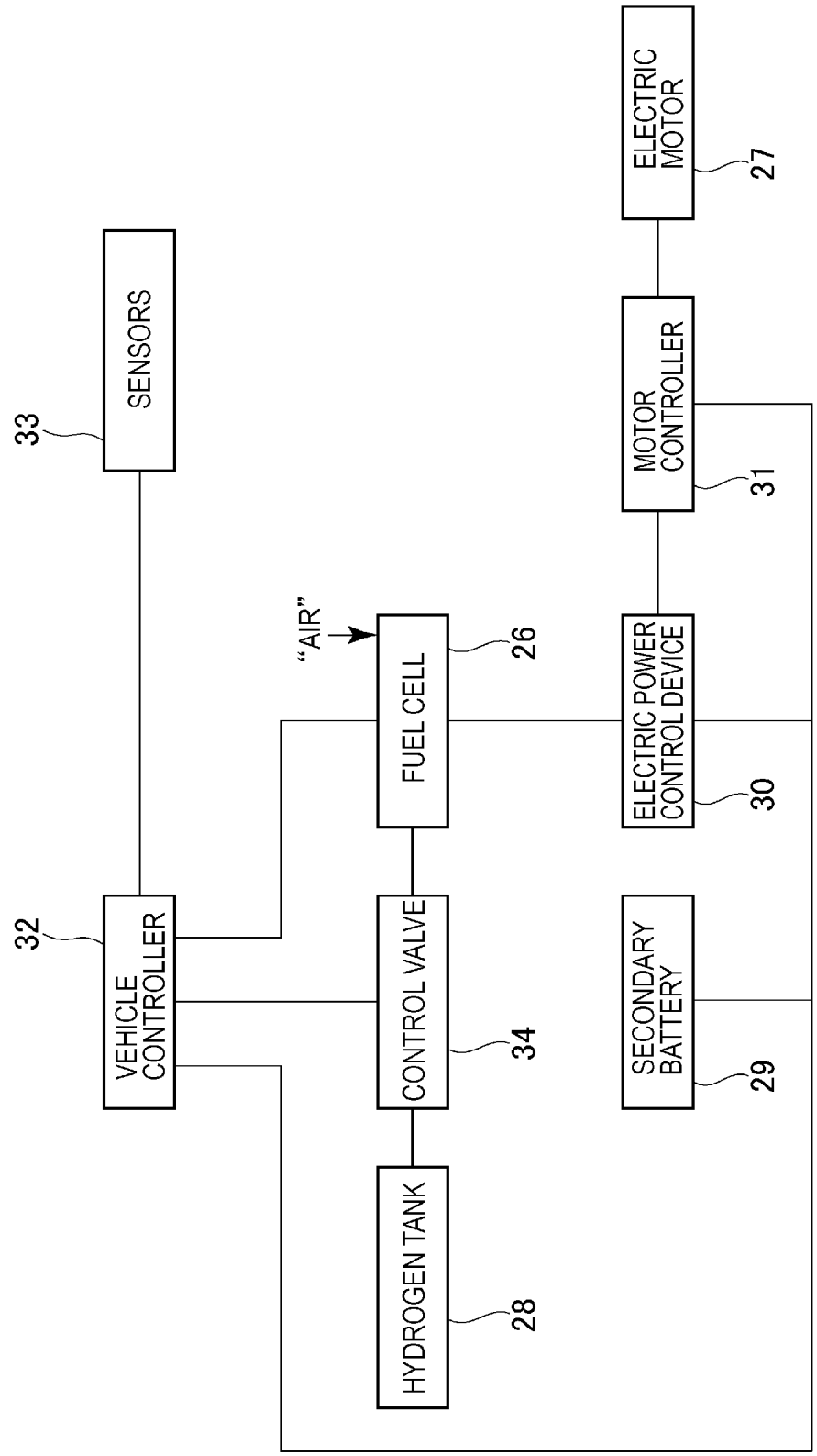
FIG. 6 is a block diagram illustrating a drive control system or a similar system in the fuel cell two-wheeled vehicle according to the embodiment of the present invention.

Here, FIG. 6 is a block diagram illustrating a drive control system or a similar system in the fuel cell two-wheeled vehicle 10. As main devices configuring this drive control system, the fuel cell two-wheeled vehicle 10 includes a fuel cell 26, the electric motor 27 as an electric machine, a hydrogen tank 28, a battery pack 29, which constitutes a secondary battery, an electric power control device 30, a motor controller 31, and a vehicle controller 32. The hydrogen tank 28 is a fuel gas tank that stores hydrogen gas as fuel gas in this example. The vehicle controller 32 controls this entire drive control system. The fuel cell two-wheeled vehicle 10 also includes sensors 33, a control valve 34, and a similar member. The sensors 33 obtain various information required to control this drive control system. The control valve 34 controls a supply of hydrogen from the hydrogen tank 28 to the fuel cell 26. The sensors 33 include a throttle sensor, a pressure sensor, a temperature sensor, or a similar sensor. The throttle sensor detects a throttle operation by the rider via the handlebar grips. The pressure sensor detects pressure of the hydrogen gas supplied from the hydrogen tank 28 to the fuel cell 26. The temperature sensor detects the temperature of the hydrogen gas, which is supplied from the hydrogen tank 28 to the fuel cell 26.

The following outlies these devices. The electric power control device 30 controls the electric power generated by the fuel cell 26, converts the electric power sent from the fuel cell 26 into a 12 V-power supply, and accumulates the power supply into the battery pack 29. In addition to the drive control of the electric motor 27, the motor controller 31 performs a regenerative control. The regenerative control converts a negative torque generated in the electric motor 27 into electric power at deceleration of the fuel cell two-wheeled vehicle 10, during running a downward slope, or a similar running.

The vehicle controller 32 receives an amount of accelerator operation by the rider, which is detected by the above-described throttle sensor, and values detected by the above-described pressure sensor and temperature sensor as inputs. Additionally, the vehicle controller 32 inputs the state quantity and outputs a control signal bidirectionally with the fuel cell 26, the battery pack 29, the electric power control device 30, and the motor controller 31. Thus, the vehicle controller 32 performs operation control of the fuel cell two-wheeled vehicle 10. Specifically, during a cruise, a flat road running, or a similar running where energy required for the fuel cell two-wheeled vehicle 10 to run is comparatively small, the vehicle controller 32 supplies the electric power, which is generated by the fuel cell 26, from the electric power control device 30 to the electric motor 27 via the motor controller 31. Further, the vehicle controller 32 supplies the electric power from the electric power control device 30 to the battery pack 29 to store surplus power unnecessary for driving of the electric motor 27 into the battery pack 29.

During acceleration where the energy required for a fuel cell motorcycle 1 to run is comparatively large, an ascending slope running, or a similar running, the vehicle controller 32 supplies the electric power, which is generated by the fuel cell 26, from the electric power control device 30 to the electric motor 27 via the motor controller 31. Further, the vehicle controller 32 also supplies the electric power stored in the battery pack 29 from the electric power control device 30 to the electric motor 27 via the motor controller 31. Further, during deceleration and running of the downward slope, the vehicle controller 32 uses the electric motor 27 as an electric generator. The vehicle controller 32 supplies the regenerative electric power generated by the electric motor 27 from the electric power control device 30 to the battery pack 29 to accumulate the regenerative electric power.

Figure 5:
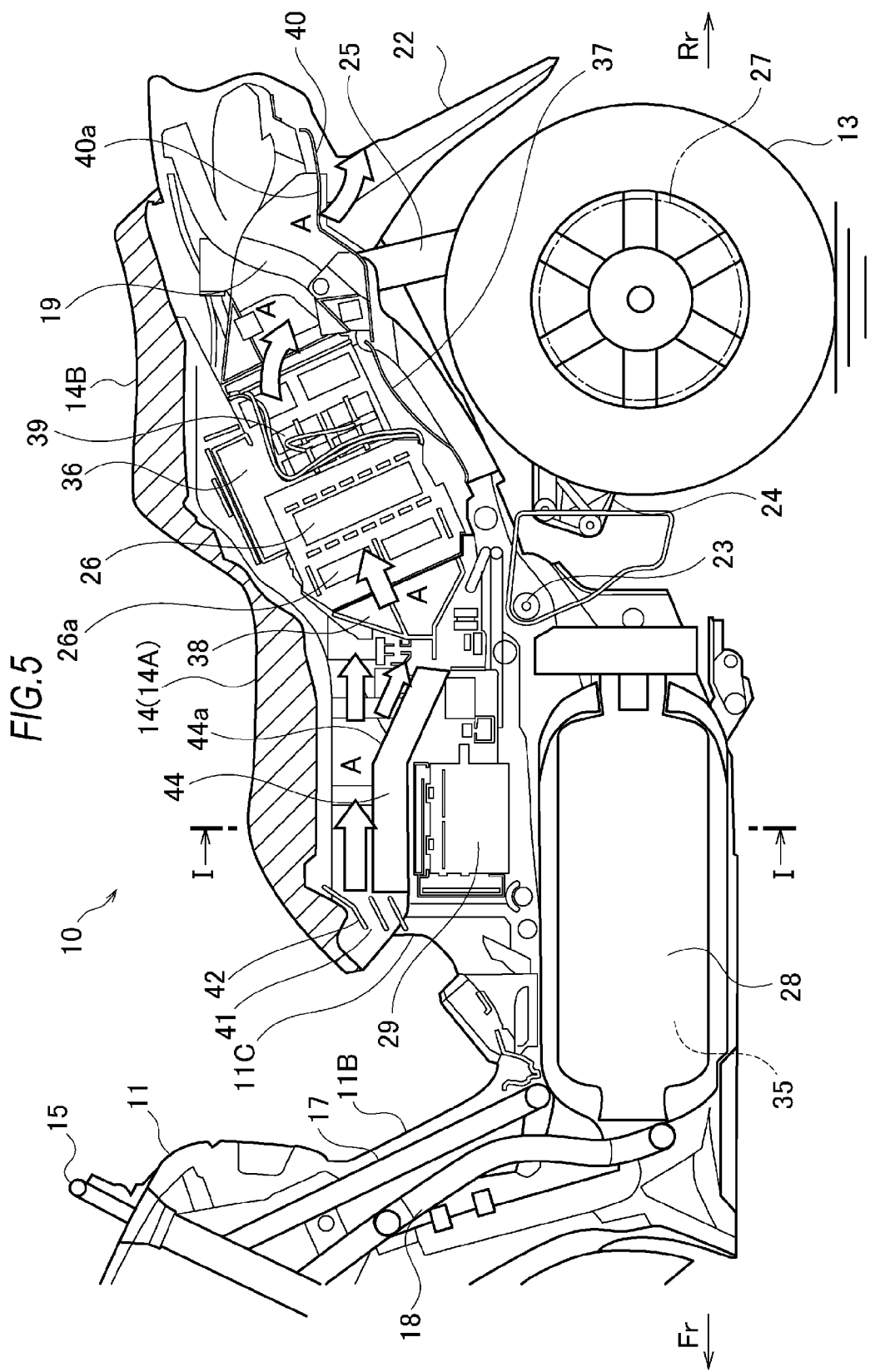
FIG. 5 is a cross-sectional view illustrating an internal structure around a rear portion of the fuel cell two-wheeled vehicle in the embodiment of the present invention.

The above-described main devices or a similar device of the drive control system is mounted inside the vehicle body cover 11. The following describes the main arrangement configuration. As illustrated in FIG. 3, an internal space 35 is surrounded by the respective right and left pair of upper frames 19 and under frames 20. In the internal space 35, the hydrogen tank 28 is installed as illustrated in FIG. 5. Although the following omits the description of the specific supporting structure of the hydrogen tank 28, the body frame can support the hydrogen tank 28 via a bracket or a similar member. The hydrogen tank 28 stores high-pressure compressed hydrogen gas as the fuel for the fuel cell 26. The hydrogen tank 28 is disposed with its longitudinal axial direction along the vehicle front-rear direction in the internal space 35, which is disposed at the lower portion and the approximately center of the vehicle. Since the hard upper frames 19 and under frames 20 surround the hydrogen tank 28, the hydrogen tank 28 is effectively protected from an impact or a similar obstacle. In appearance, the peripheral of the hydrogen tank 28 is covered with the center body cover 11B.

Figure 7:
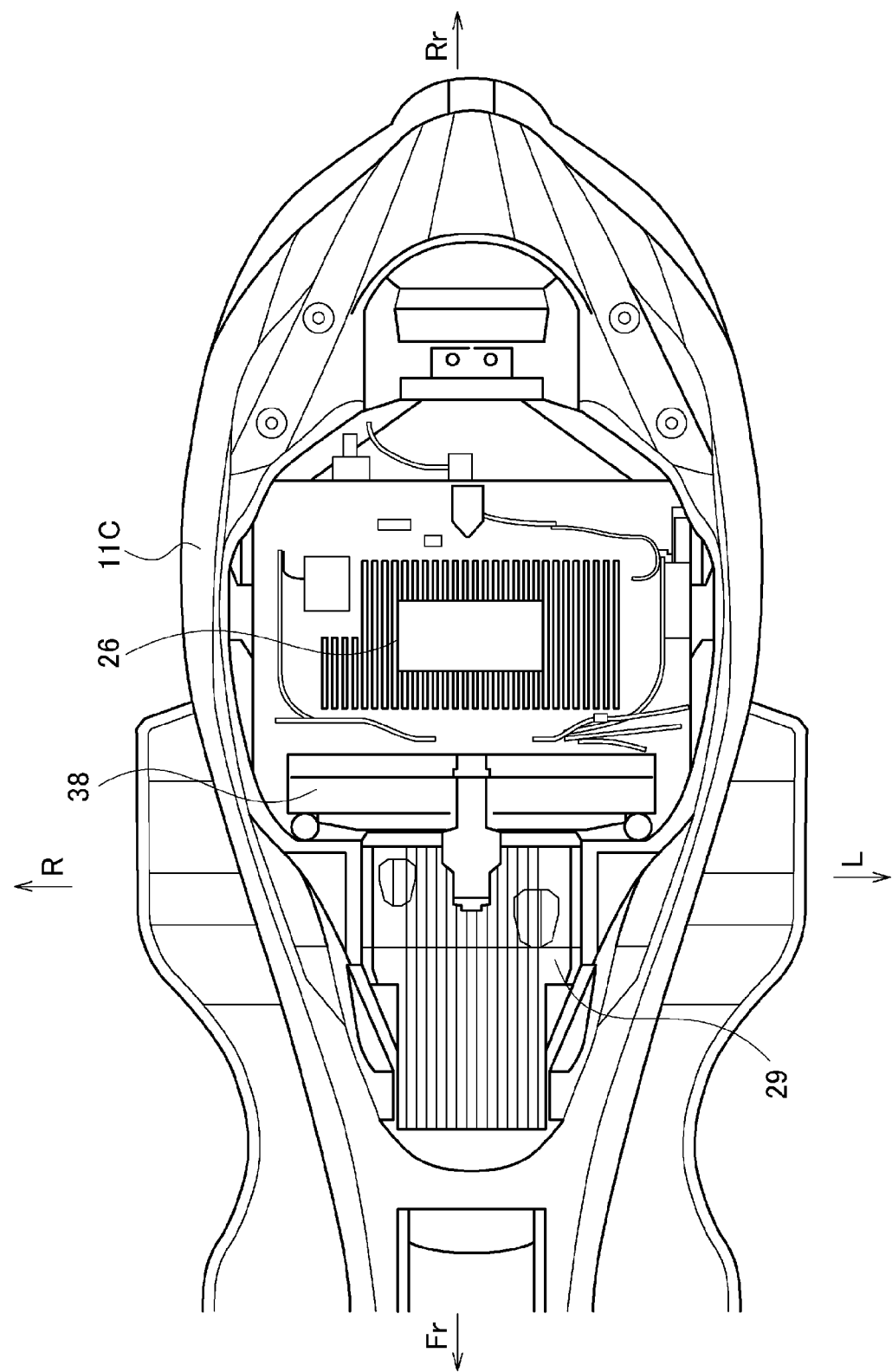
FIG. 7 is a top view illustrating a state where main devices of the fuel cell two-wheeled vehicle according to the embodiment of the present invention are mounted inside the vehicle body cover.
Figure 8:
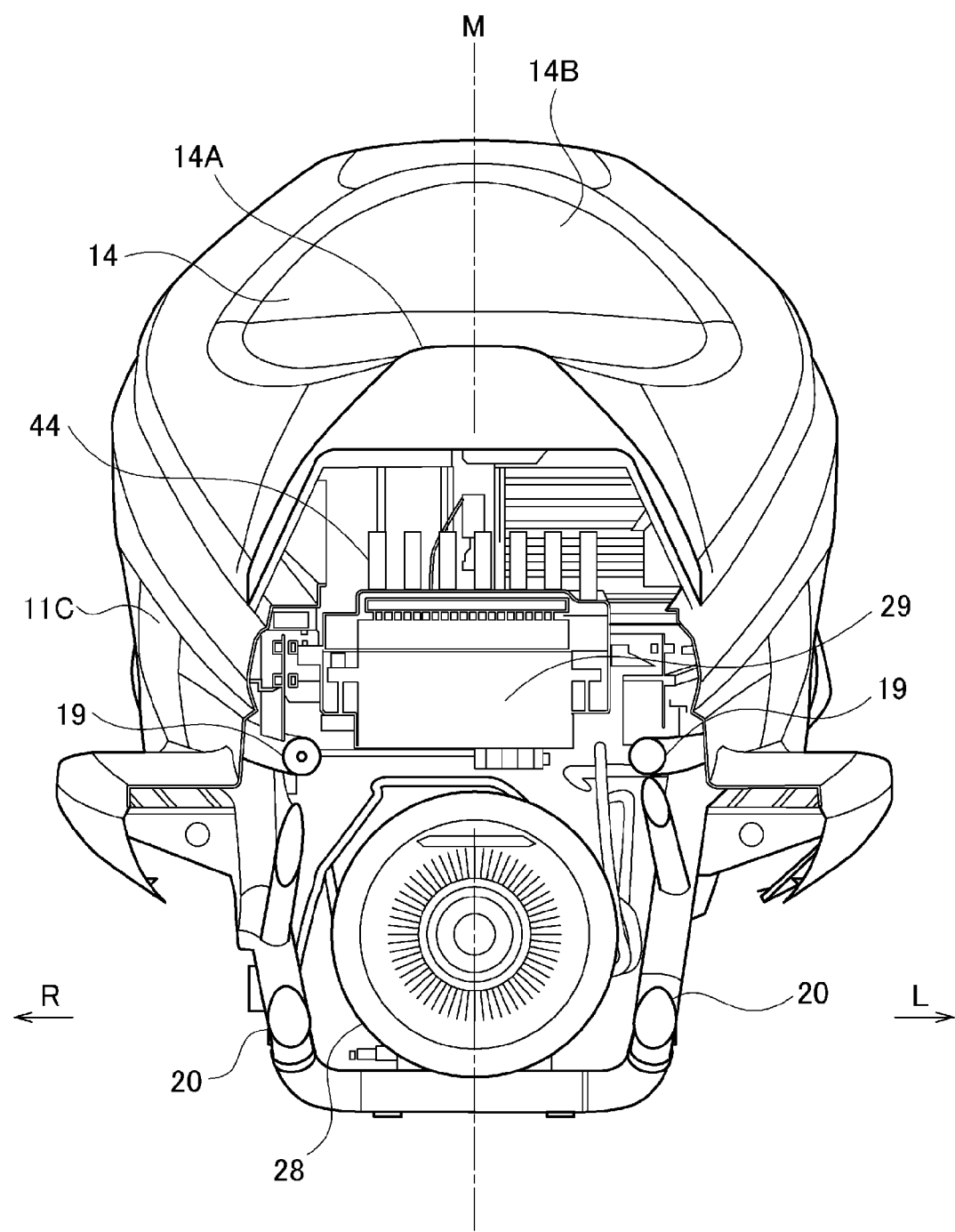
FIG. 8 is a cross-sectional view taken along the line I-I in FIG. 5 illustrating a state where the main devices of the fuel cell two-wheeled vehicle according to the embodiment of the present invention are mounted inside the vehicle body cover.

As illustrated in FIG. 5, an internal space 36 is surrounded by rear portions 19a (see FIG. 3) of the right and left pair of upper frames 19 and the seat 14 (see the shaded area in FIG. 5). The fuel cell 26, the battery pack 29, and a similar member are installed to the internal space 36. In this case, the seat 14 is formed by consecutively installing a rider seat 14A and a tandem seat 14B back and forth. The battery pack 29 and the fuel cell 26 are positioned at approximately below the respective seats and are disposed providing a predetermined interval back and forth. Although the following omits the description of the specific supporting structure of the fuel cell 26, the battery pack 29, or a similar member, the body frame can support the fuel cell 26, the battery pack 29, or a similar member via the bracket or a similar member. The peripheral areas of the fuel cell 26 and the battery pack 29, which are disposed in the internal space 36, are covered with the rear body cover 11C. FIG. 7 and FIG. 8 also illustrate the state where the main devices and a similar device are thus installed inside the vehicle body cover 11.

Further, as illustrated in FIG. 5, a cover member 37 is outfitted below the fuel cell 26 so as to cover a periphery between the mutual rear portions 19a of the right and left upper frames 19. This cover member 37 isolates the periphery of the rear lower portion of the internal space 36 from a wheel housing of the rear wheel 13. The wheel housing is formed below the rear fender 22. The seat 14, the rear body cover 11C, and the cover member 37 cover the internal space 36 where the fuel cell 26 and the battery pack 29 are disposed. This substantially forms a sealing structure.

Devices other than the above-described devices, that is, the electric power control device 30, the motor controller 31, the vehicle controller 32, or a similar device can be supported to appropriate positions on the vehicle body frame using the effective space inside the vehicle body cover 11.

Thus, the plurality of devices are installed and disposed inside the vehicle body cover 11 as the exterior member. At the same time, the vehicle body cover 11, in particular, inside the rear body cover 11C functions as an air flow path. That is, air is taken in the inside of the rear body cover 11C from an intake air inlet, which will be described later, to pass through the air as reactant gas to be supplied to the fuel cell 26. Alternatively, air as cooling wind is passed through the devices or a similar member in the rear body cover 11C required to be cooled. Arrows A in FIG. 5 indicate a typical air flow path formed in this vehicle body cover 11, especially in the rear body cover 11C (hereinafter referred to as an air flow path A as necessary). The fuel cell 26, the battery pack 29, or a similar member to which the reactant gas or the cooling wind is supplied is disposed at the appropriate positions in the middle of the air flow path A. In this example, as illustrated in FIG. 5, the fuel cell 26 is disposed above the rear wheel 13, which is the drive wheel, and downward the seat 14 (the tandem seat 14B) inclining forward. Here, the fuel cell 26 has a laminated structure where the fuel cell stacks are arrayed in a casing with box shape or rectangular parallelepiped shape. As illustrated in FIG. 5, the fuel cell 26 includes an intake air portion 26a on the front surface side of this box shape. The air as the reactant gas is supplied to the intake air portion 26a. More specifically, the intake air portion 26a orients downward to the front while inclining forward. The intake air portion 26a is disposed to be opposed to the air flow path A formed by air from an air intake duct, which will be described later.

Figure 9:
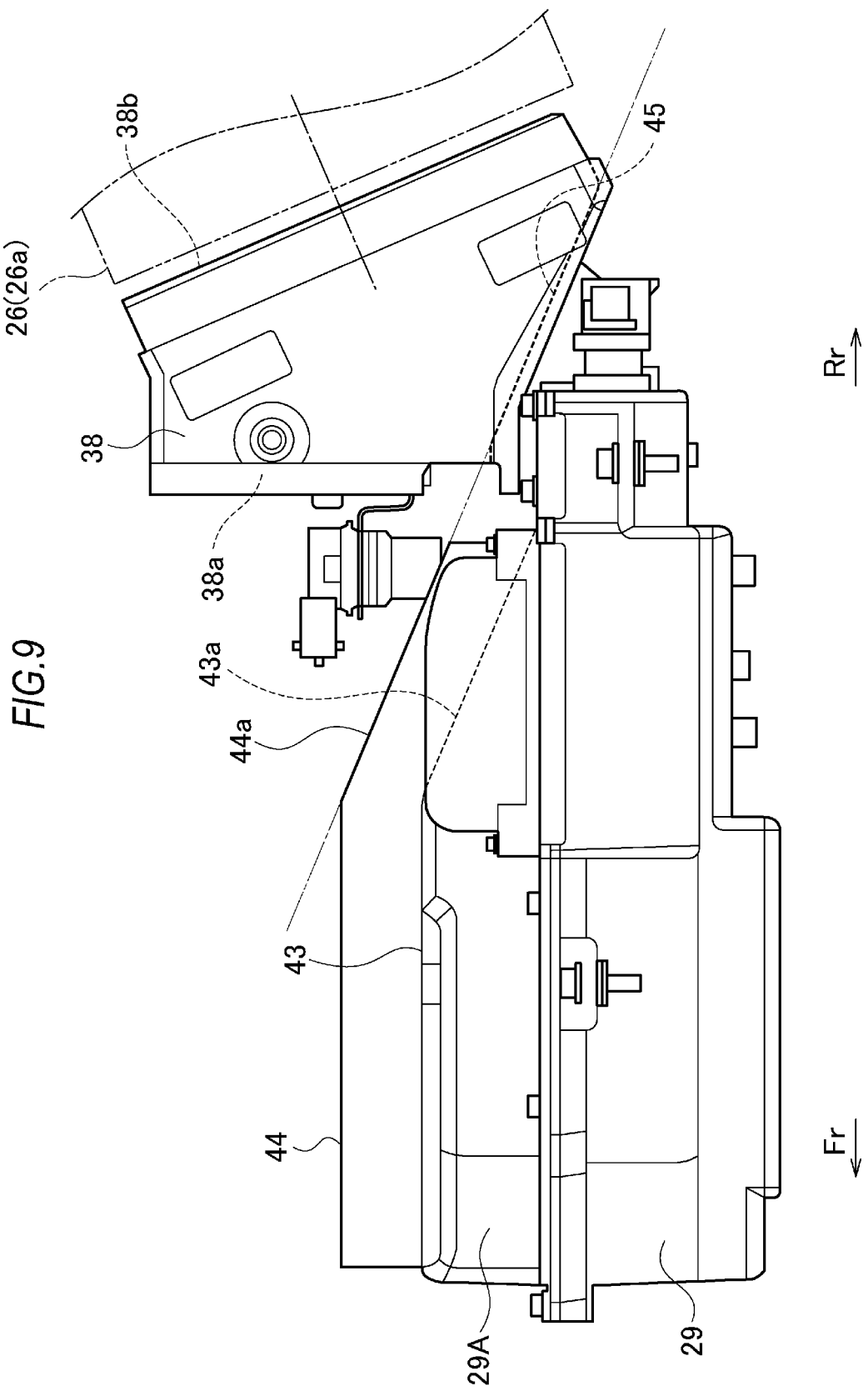
FIG. 9 is a side view illustrating around a battery pack of the fuel cell two-wheeled vehicle according to the embodiment of the present invention.

As illustrated in FIG. 3 or FIG. 5, an air intake duct 38 is disposed at the front of the fuel cell 26. As illustrated in FIG. 9, the air intake duct 38 generally has a deformed triangular shape or a similar shape in the vehicle side view. The air intake duct 38 has a hollow wall structure where the air flow path A is formed in the internal spaces. The internal spaces are defined and formed by a surrounding exterior plates and typically has a rectangular shape in the cross section. The air intake duct 38 includes inflow ports 38a on the front end portion (see FIG. 10A) and outflow ports 38b on the rear end portion (see FIG. 10B). The inflow port 38a is open orienting the front-rear direction. The outflow port 38b is open orienting the rear upward. As illustrated in FIG. 9, the air intake duct 38 and the fuel cell 26 are consecutively installed such that the respective orientation angles of the outflow port 38b of the air intake duct 38, which orients rear upward, and the intake air portion 26a of the fuel cell 26, which orients the front downward, match.

As illustrated in FIG. 5, at the rear surface side of the box-shaped fuel cell 26, an air intake fan 39 and an exhaust air duct 40 are further installed consecutively. The intake fan 39 introduces the air for both reaction and cooling to the fuel cell 26. The exhaust air duct 40 is disposed at the rear of this air intake fan 39. The air passing through the exhaust air duct 40 is discharged from an exhaust air port 40a of this exhaust air duct 40 to the lower surface side of the vehicle body cover 11 (the rear body cover 11C). The fuel cell 26 generates electric power by chemical reaction between the hydrogen gas supplied from the hydrogen tank 28 and oxygen contained in the air supplied via the air intake duct 38. After this, humid surplus gas is discharged from the exhaust air port 40a. In this process, the fuel cell 26 is cooled by the air as the reactant gas.

Here, as illustrated in FIG. 5, an intake air inlet 41 is disposed under the front portion of the seat 14 (the rider seat 14A). The intake air inlet 41 takes in the air to the inside of the rear body cover 11C. With the present invention, especially the battery pack 29 is in a space between the intake air inlet 41 and the air intake duct 38 and surrounded by the seat 14 and the vehicle body cover 11 (the rear body cover 11C) in the internal space 36. The intake air inlet 41 is disposed immediately under the front portion of the seat 14. As illustrated in FIG. 5, louvers 42 are mounted to the intake air inlet 41.

Figure 10A:
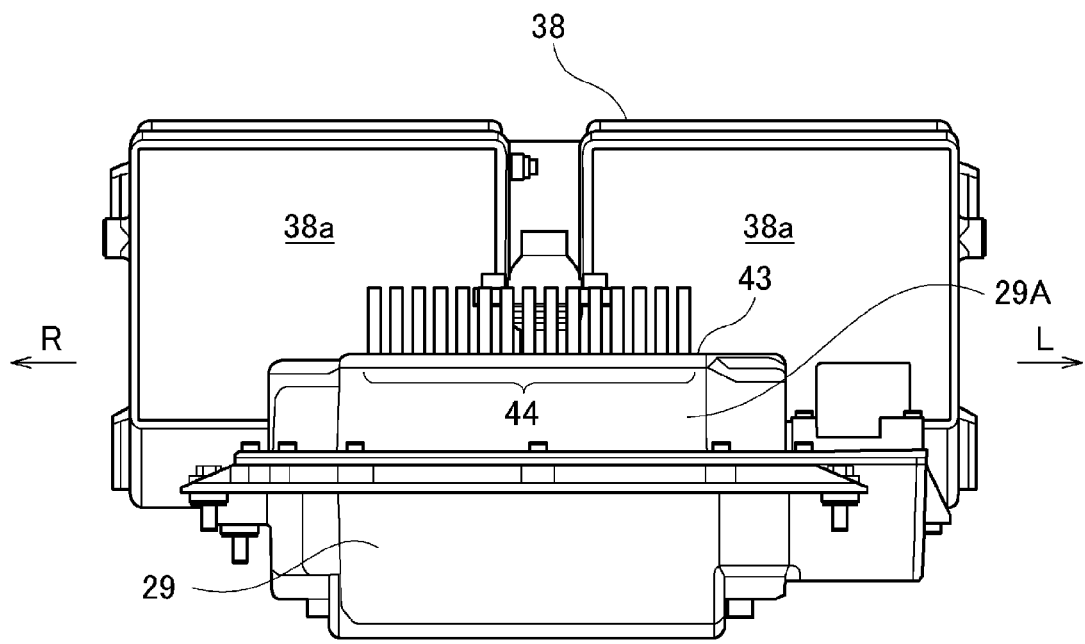
FIG. 10A is a front view illustrating around the battery pack of the fuel cell two-wheeled vehicle according to the embodiment of the present invention.
Figure 10B:
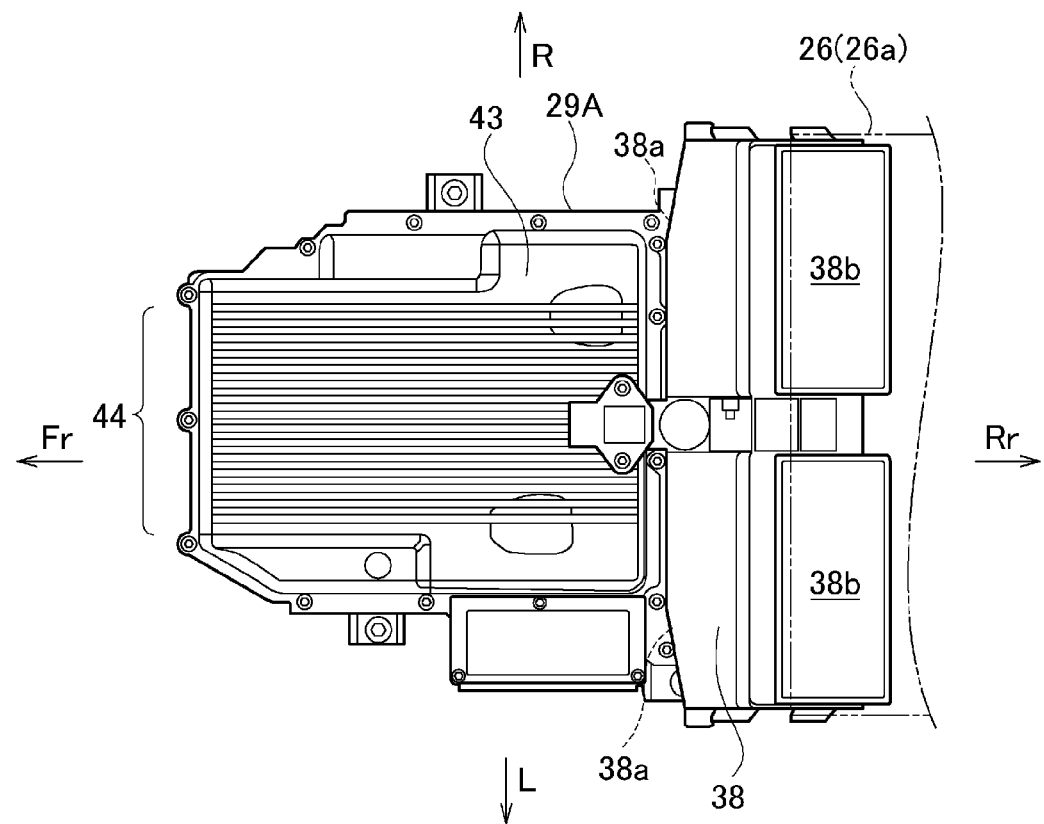
FIG. 10B is a top view illustrating around the battery pack of the fuel cell two-wheeled vehicle according to the embodiment of the present invention.

As illustrated in FIG. 9, FIG. 10A, and FIG. 10B, the battery pack 29 generally builds in the batteries in the box-shaped casing. Cooling fins 44 are disposed upright on a top surface 43 along the vehicle front-rear direction. In this case, the cooling fins 44 are integrally formed with an upper cover 29A, which is typically made of an aluminum alloy, of the battery pack 29. The plurality of cooling fins 44 are disposed at predetermined intervals in the vehicle-width direction. Gaps are formed between the cooling fins 44 adjacent to one another. As illustrated in FIG. 10A, the cooling fins 44 are positioned at the approximately center of the inflow ports 38a of the air intake ducts 38 in the vehicle front view. Both in the vertical direction and the lateral direction, the cooling fins 44 are disposed within the regions of the inflow ports 38a.

As illustrated in FIG. 9, the cooling fins 44 are disposed approximately parallel to the top surface 43 of the battery pack 29 in the vehicle side view. That is, the cooling fins 44 are formed along the vehicle front-rear direction on the top surface 43 of the battery pack 29. A rear portion 43a of the top surface 43 of the battery pack 29 is inclined downward to the rear at an approximately identical angle to a bottom surface 45 of the air intake duct 38. This aligns a top 44a of the cooling fins 44, which are formed at the rear portion 43a of the top surface 43 of the battery pack 29, with the bottom surface 45 of the air intake duct 38 on the approximately identical one surface as indicated by the one dot chain line in FIG. 9.

As illustrated in FIG. 8, in the vehicle front view, the battery pack 29 is disposed so as to match its center with a vehicle center line M and be approximately symmetrical. Similarly, the fuel cell 26 and the hydrogen tank 28 are actually disposed so as to be approximately symmetric with respect to the vehicle center line M.

With the fuel cell two-wheeled vehicle 10 of the present invention, the actuation of the air intake fan 39 introduces the air for both reaction and cooling to the fuel cell 26. The air is taken in from the intake air inlet 41 to the inside of the rear body cover 11C. The air is passed through along the air flow path A (see FIG. 5) and then is supplied to the fuel cell 26. As described above, the fuel cell 26 generates electric power by chemical reaction between the hydrogen gas supplied from the hydrogen tank 28 and oxygen contained in the air supplied via the air intake duct 38. During this process, the fuel cell 26 is cooled by the air as the reactant gas.

With the present invention, especially the battery pack 29 is in the space between the intake air inlet 41 and the air intake duct 38 and surrounded by the seat 14 and the rear body cover 11C, which constitutes the vehicle body cover 11, that is, in the internal space 36.

That is, the battery pack 29 is disposed at the appropriate position in the middle of the air flow path A. This causes the air as the cooling wind taken from the intake air inlet 41, which is under the seat 14, to pass through the top surface 43 of the battery pack 29 and the periphery of the battery pack 29. Thus, flowing of the cooling wind around the battery pack 29 allows forcibly air-cooling the battery pack 29, ensuring cooling the secondary batteries in the battery pack 29.

In this case, the intake air inlet 41, which is to take in the air from the external air, is disposed at a high position on the front portion of the seat 14 and at a position set back and hidden under the seat 14. The louvers 42 are mounted to the intake air inlet 41.

Devising the installation position of the intake air inlet 41 and disposing the louvers 42 makes it difficult for a cloud of sand and raindrops to enter the intake air inlet 41. This allows preventing performance degrade of the fuel cell in association with degrade of the filter.

With the intake air inlet 41, which is disposed at the front portion of the seat 14, the travelling wind can also be partially employed. This also allows saving used electric power by the use of ram pressure.

The cooling fins 44 are formed along the vehicle front-rear direction on the top surface 43 of the battery pack 29. Thus, the cooling fin 44 disposed on the top surface 43 of the battery pack 29 rectifies the air flowing from the intake air inlet 41 along the air flow path A. This allows reducing a loss of intake air pressure to be taken into the fuel cell 26.

Rectifying the flow of the air supplied to the fuel cell 26 increases the air intake efficiency of the fuel cells 26. As a result, the power generation efficiency of the fuel cell 26 can be raised.

A rectifying action by the cooling fins 44 enhances directivity of the air flowing along the air flow path A to the fuel cells 26. This allows installing the air intake duct 38, which is disposed in front of the fuel cells 26, with shorter duct length (mainly in the front-rear direction). This allows disposing the members achieving space-saving in a limited, narrow, and small space.

In this case, the cooling fins 44, which are disposed on the top surface 43 of the battery pack 29, are projected parallel to the air flow path A. This causes the cooling wind to flow along a groove structure between the mutual cooling fins 44. This improves cooling performance for the battery pack 29, allowing effectively cooling heat generating components (the secondary batteries), which is built-in the battery pack 29.

The top 44a of the cooling fins 44, which are formed at the rear portion 43a of the top surface 43 of the battery pack 29, is coupled to the bottom surface 45 of the air intake duct 38 on the approximately identical one surface.

This allows the cooling wind flowing the top surface 43 of the battery pack 29 to also flow into the lower surface of the air intake duct 38 along the inclined surface of the rear portion 43a. Thus, the air can be taken using the entire front region of the fuel cell 26. This allows minimizing the reduction in air intake efficiency, substantially improving the air intake efficiency.

Further, since the plurality of constituting members, such as the battery pack 29, the air intake duct 38, the fuel cell 26, and the hydrogen tank 28 are disposed on the vehicle center line M, the lateral balance of the vehicle is improved, and therefore, running stability is improved.

While the present invention has been described using various embodiments above, the present invention is not limited only to these embodiments. Changes and similar modification are possible within the scope of the present invention.

In the embodiments, the count of the cooling fins 44, the gap between the mutual cooling fins 44, or a similar specification can be appropriately changed as necessary.

According to the present invention, the air as the cooling wind taken in from the intake air inlet passes through the periphery of the battery pack disposed at the appropriate position in the middle of the air flow path. This allows forcibly air-cooling the battery pack around which the cooling wind flows. This allows ensuring cooling the secondary batteries in the battery pack.

What is claimed is:

1. A fuel cell two-wheeled vehicle, comprising:
   an electric machine configured to drive a drive wheel;
   an air-cooled fuel cell configured to supply electric power to the electric machine; and
   a fuel gas tank that accumulates fuel gas supplied to the fuel cell, wherein
   the fuel cell is inclined forward inside a vehicle body cover, the vehicle body cover covering a right and left and backward and forward of a seat from a lower side, the fuel cell being disposed above the drive wheel and below the seat, an air intake duct being disposed at a front of the fuel cell,
   an air intake fan is coupled to an exhaust air duct, the air intake fan being configured to introduce air for both reaction and cooling to the fuel cell, the exhaust air duct being disposed at a rear of the air intake fan, air that has passed through the exhaust air duct being discharged from a discharge port of the exhaust air duct to a lower surface side of the vehicle body cover, and
   a battery pack is disposed in a space between an intake air inlet and the air intake duct and surrounded by the seat and the vehicle body cover, the intake air inlet being disposed below a front portion of the seat.

2. The fuel cell two-wheeled vehicle according to claim 1, wherein
   a cooling fin is disposed on a top surface of the battery pack along a vehicle front-rear direction.

3. The fuel cell two-wheeled vehicle according to claim 2, wherein
   the cooling fin is disposed approximately parallel to the top surface of the battery pack in a vehicle side view, a rear portion of the top surface being declined downward to a rear at an approximately identical angle to a bottom surface of the air intake duct, and
   a top of the cooling fin at the rear portion is aligned to the bottom surface of the air intake duct on a single downward surface.

4. The fuel cell two-wheeled vehicle according to claim 1, wherein
   in a vehicle front view, the battery pack is disposed approximately symmetric with respect to a vehicle center line.

* * * * *